United States Patent [19]

Gamaunt

[11] 4,153,227

[45] May 8, 1979

[54] FLUID SELF-CENTERING VIBRATION AND SHOCK MOUNT

[76] Inventor: Roger L. Gamaunt, P.O. Box 55, Fawnskin, Calif. 92333

[21] Appl. No.: 826,141

[22] Filed: Aug. 19, 1977

Related U.S. Application Data

[63] Continuation of Ser. No. 635,931, Nov. 28, 1975, abandoned.

[51] Int. Cl.² .......................... B29B 1/08; B29C 1/16
[52] U.S. Cl. .................................... 248/575; 248/614; 248/631
[58] Field of Search ..................... 248/20, 21, 22, 350, 248/358 R; 269/122, 123, 153

[56] References Cited

U.S. PATENT DOCUMENTS

| | | | |
|---|---|---|---|
| 1,003,579 | 9/1911 | Bancroft | 248/358 R X |
| 2,685,425 | 8/1954 | Wallerstein | 248/22 X |
| 2,756,016 | 7/1956 | Painter | 248/22 X |
| 3,008,703 | 11/1961 | Slemmons et al. | 248/22 X |
| 3,202,388 | 8/1965 | Goodwin | 267/122 X |
| 3,233,886 | 2/1966 | Saffell et al. | 267/122 |
| 3,351,027 | 11/1967 | Ellard et al. | 248/22 UX |
| 3,444,999 | 5/1969 | Hurst | 248/22 X |
| 3,625,466 | 12/1971 | Marshall | 248/358 R |

FOREIGN PATENT DOCUMENTS

| | | | |
|---|---|---|---|
| 546004 | 6/1942 | United Kingdom | 248/22 |
| 658898 | 10/1951 | United Kingdom | 248/358 R |

*Primary Examiner*—J. Franklin Foss
*Attorney, Agent, or Firm*—Thomas W. Cole

[57] ABSTRACT

A vibration eliminating mount for supporting a load is disclosed herein having a three point suspension wherein each of the three points includes a pair of angularly disposed brackets secured to the load and the support respectively. Carried between opposing parallel surfaces on the brackets is a fluid vibration eliminating assembly movably separating the pair of brackets. The assembly is carried in a dish or pan which is fixedly secured to at least one of the brackets and provision is made for accommodating a fluid valve for suitably pressurizing the assembly.

17 Claims, 5 Drawing Figures

FLUID SELF-CENTERING VIBRATION AND SHOCK MOUNT

This is a continuation of application Ser. No. 635,931, filed Nov. 28, 1975, now abandoned.

BACKGROUND OF THE INVENTION

1. Field of the Invention

This invention relates to vibration eliminating devices providing three point suspension employing a combination of fluid assemblies for self-centering the load being supported.

2. Brief Description of the Prior Art

In the past, it has been the conventional practice to support loads on fixed structure by means of resilient pads such as compressed rubber, cork, rubberized diaphragms or the like. Usually, these latter elements are captured in a frame which is then secured between the load and the supporting structure so that the device will flex or decrease vibration and shock when applied loads are transmitted to the cargo or product being supported. Furthermore, it has been current practice to combine several of such devices so that multiple point suspension is derived. However, it is the usual practice to employ four or two point suspension but it is not the general case to use an odd number of suspension points. Furthermore, although the prior art elements are flexible and composed of shock absorbing materials, they only partially reduce the amount of vibration and it is sometimes difficult to adjust or pressurize the elements to a desired degree of softness to completely eliminate vibration. Examples of the prior art shock absorbing systems are disclosed in U.S. Pat. Nos. 3,476,340; 3,545,706 and 2,232,456. Although these prior mounting systems are operable for their intended purposes, it is to be noted that the prior art references show angular suspensions for the load being carried but that four or two point suspensions are employed only for securing the opposite ends of the load. Also, it is to be noted that the shock absorbing elements are relatively rigid and do not employ adjustment means for determining their degree of compressive loading. Furthermore, the prior art devices employ vibration suppressing mounts which are at angles other than perpendicular to the horizontal and which do not provide for a three point suspension system.

Therefore, a long standing need has existed to provide for a more efficient vibration eliminating suppression system than the prior art devices can offer. Such a need also encompasses such a requirement for self-centering the load on the shock mounting system without restraints so that installation is simplified as well as suspension efficiency increased.

SUMMARY OF THE INVENTION

Accordingly, the above problems and difficulties are obviated by the present invention which provides a novel system having a one to three point suspension mount which is self-centering. The invention includes the placement of at least one to three fluid means such as pneumatic assemblies which are arranged to achieve vibration supression.

In one form of the invention, each of the fluid means includes an inflatable member or element disposed between opposing parallel surfaces carried by brackets which are respectively secured to the cargo or load and the supporting structure. Preferably, the inflatable member or element is carried within the circular side wall of a dish or pan-like member which is fixedly secured to a selected one of the brackets.

In the case of an internal combustion engine-powered generator used as a power supply for boats, motorhomes, and aircraft or the like, the generator may be mounted per this invention and using air (4 lbs PSI) encased in a light innertube, the vibrating power unit still vibrates at the normal amplitude; but this vibration will not pass through the supporting means (4 lbs PSI of air restrained by a light air bag) and into the parent vehicle.

Therefore, it is among the primary objects of the present invention to provide a novel vibration eliminating system.

Another object of the present invention is to provide a novel pneumatic means for vibration absorption a novel pneumatic means for vibration absorption encountered by cargo during transit in which the fluid viscosity is adjusted to determine its compressibility characteristics for efficiently reacting to applied vibration.

Still another object of the present invention is to provide a novel vibration suppression system employing inflatable tubes accommodating transmission of loads into the supporting structure.

Yet a further object of the present invention is to provide a novel self-centering, three point suspension system for mounting cargo employing one or more tubes that may be filled with fluids of different viscosities and/or pressures in order to support cargo weight.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

DESCRIPTION OF THE PREFERRED EMBODIMENT

Figure 1:
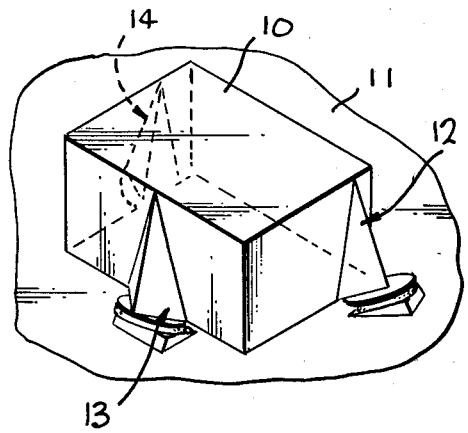
FIG. 1 is a perspective view of a typical cargo or load suspended on the three point suspension and vibration absorbing system of the present invention.

Referring to FIG. 1, the novel vibration suppression and absorbing suspension system is illustrated in connection with mounting a cargo or load 10 onto a supporting base or frame or platform 11. The suspension system includes a combination of three suspension assemblies which are arranged at approximately 120° apart and which are mounted in an angularly orientation with respect to the supporting floor 11. Each of the suspension assemblies comprising the three point system is identified by the numerals 12, 13 and 14. It can be seen that the suspension assemblies are arranged on different sides and end of the cargo 10.

Figure 2:
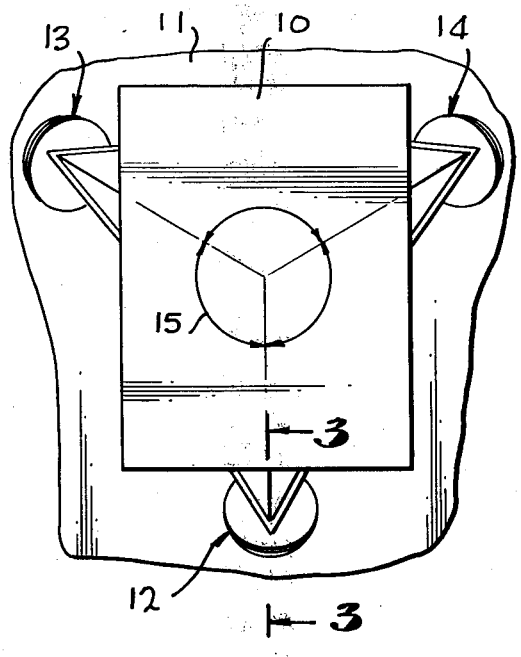
FIG. 2 is a top plan view of the suspension system and cargo as shown in FIG. 1.

Referring in detail to FIG. 2, it can be seen that the suspension assemblies 12-14 inclusive are arranged to provide a three point suspension system so that the load or cargo 10 is self-centering between the suspension assemblies. The angular relationship illustrated is approximately 120° as is indicated by the double arrows degree line identified as numeral 15. However, it is to be understood that other angular relationships may be established than 120° since shape and general overall configuration of the load or cargo 10 must be considered. It is critical that the angular relationship be such that horizontal angles with respect to adjacent suspension assemblies be as close to 120° as possible.

Figure 3:
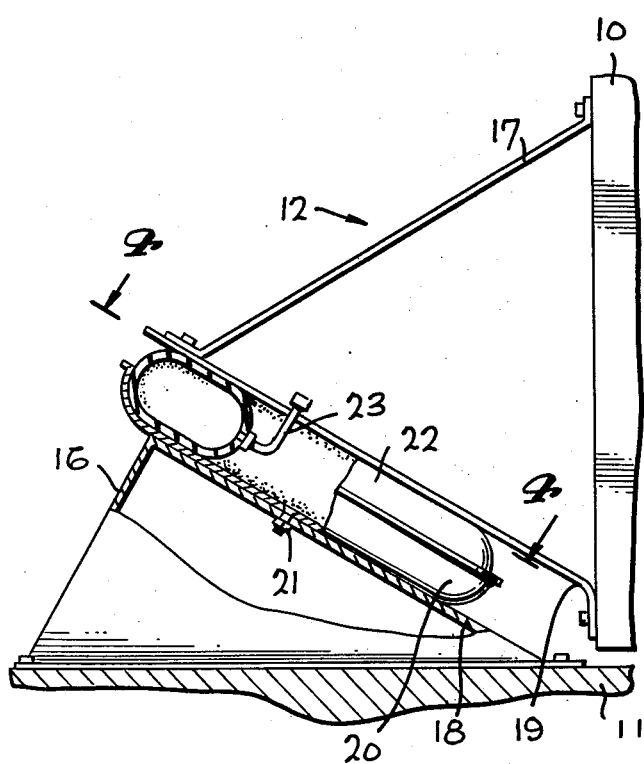
FIG. 3 is an enlarged cross sectional view of one element in the three point suspension system as taken in the direction of arrow 3—3 of FIG. 2.

Referring now in detail to FIG. 3, an enlarged view of suspension assembly 12 is illustrated in cross section and it is to be understood that the other two suspension assemblies are constructed and assembled in an identical manner. A pair of brackets 16 and 17 are carried on the supporting frame or floor 11 and cargo 10, respectively. Each of the brackets 16 and 17 include a flat surface 18 and 19 which oppose each other and are parallel with respect to each other. Surface 18 carries a circular open pan 20 which is fixedly secured to the bracket 16 by means of a fastener 21. The pan 20 opens in the direction of opposing surface 19 of bracket 17 and the pan 20 carries a fluid means such as a pneumatic element 22 therein as confined by the circular side wall of the pan. The pneumatic element takes the form of an inflatable tube which includes a conventional one-way or check valve 23 for conducting suitable inflation gases or other fluids to the interior of the tube. As an example, air under pressure is introduced through the valve stem 23 into the interior of the tube 22. The tube 22 may be inflated to a desired or specified psi depending upon the cargo or load to be suspended.

It is also to be noted that the vertical angular orientation of the pneumatic element 22 with respect to its supporting floor is approximately 30°. By angling the three pneumatic elements at approximately 30°, self-centering of the load 10 is achieved and by employing three pneumatic elements, the three point suspension of the load or cargo is achieved. In any event, the vertical angle should be determined to provide the lowest vibration level for each particular application. The angle may even be more than 90° with respect to the supporting surface such as angled outwards. The angular relationship is influenced by the applied loads with respect to the cargo center of gravity. An alternating load applied above the CG will cause a maximum load to be experienced by the supporting structure because the system supports have a horizontal stiffness. There will also be a horizontal load and an arcuate moment above the CG if the load is applied to the cargo higher or lower than the CG. This latter load and moment may either add to or subtract from the load felt by the support structure.

However, if an alternating load is applied at the CG, there is no reaction at the support structure because of the reciprocation of the load. If the alternating load is applied above or below the CG, there will be the same kind of added load reaction at the support structure as there is with the former described system because the cargo or unit will attempt to rotate and thereby always add to the total load felt by the support structure.

To avoid or obviate rocking of the cargo, weight can be added to the top or bottom of the cargo or unit to make the CG coincide with the plane of the load.

The inventive concept is intended to include three dimensional mounting arrangements which will support a load regardless of what the attitude of the cargo or unit may be. In this instance, a fluid mounting means would be attached at multiple points with their line of action extending through the CG of the cargo or unit.

Figure 4:
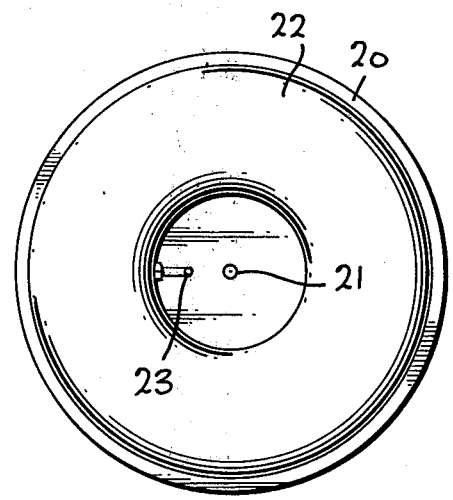
FIG. 4 is a sectional view taken in the direction of arrow 4—4 of FIG. 3.

In FIG. 4, it can be seen that the pneumatic element 22 is circular and that it is coaxially disposed with respect to the pan 20 and the fastener 21 securing the pan to bracket 18. Each of the pneumatic tubes associated with each of the suspension assemblies is carried in a pie-shaped base or pan 20 which is rigidly attached to the support or bracket so that the angle orientation is maintained with respect to the support. A cargo or load 10 is carried on the opposite side of the pneumatic element and can move toward and away from the pan or pie-shaped base in a resilient manner depending upon the degree of air pressure or inflation carried in the pneumatic element.

Figure 5:
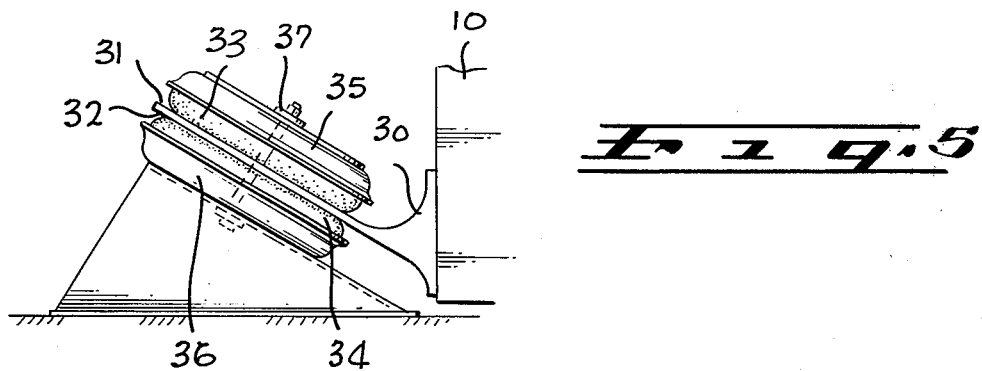
FIG. 5 is a side elevational view illustrating another embodiment of the present invention employing a pair of pneumatic elements.

Another suspension assembly covered by the present invention is illustrated in FIG. 5. In this latter embodiment, the cargo 10 includes a angle bracket 30 having parallel opposite sides or surfaces 31 and 32 to which are attached a pair of pneumatic elements 33 and 34, respectively. The opposite sides of the pneumatic elements are disposed within the pie-shaped bases or pans 35 and 36 and the elements are held together in compression against surfaces 31 and 32 by a common fastener 37. In this arrangement, the cargo is still mounted at three point by the cooperating shock absorbing pneumatic element. However, the dual arrangement of the pneumatic element per suspension assembly permits the top tube 33 to be less inflated than the lower pneumatic element of the pair identified by numeral 34.

For example, element 33 may be inflated to an air pressure of two pounds whereas the inflation on element 34 may be five pounds. Such an arrangement provides restraint of cargo during shock absorption as well as vibration suppression during severe operation such as in the field of marine vehicles, off the road vehicles, aircraft or the like.

In view of the foregoing, it can be seen that the suspension system of the present invention provides for a three point, self-centering suspension for the load or cargo 10 and that the vibration and/or shock loads encountered by the frame or support 11 are absorbed by the pneumatic elements and are not transmitted into the load. The pneumatic elements are adjustable by inflation or deflation of the pneumatic elements at the selection of the operator or user. Also, the tubes may be filled with a liquid rather than a gas so that vertical stiffness is gained with low horizontal stiffness. The desired tube fill, whether gas or liquid, may be selected to obtain a low or high vertical spring rate. If the tube is elastic, such as a rubber composition, and the fluid is of significant viscosity, then damping is obtained from the system. In this latter instance, the system may be considered a shock absorber.

Figure 6:
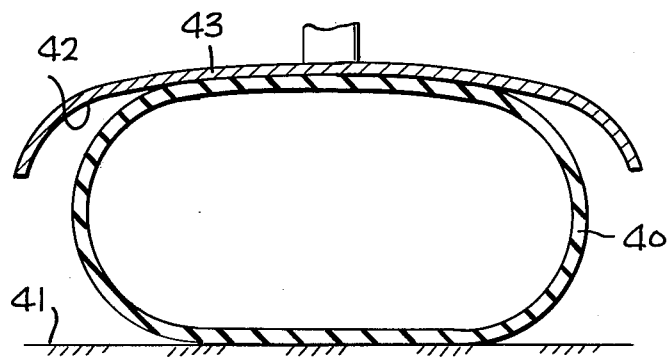
FIG. 6 is a transverse cross sectional view of another form of the inventive concept employing self-centering characteristics.
Figure 7:
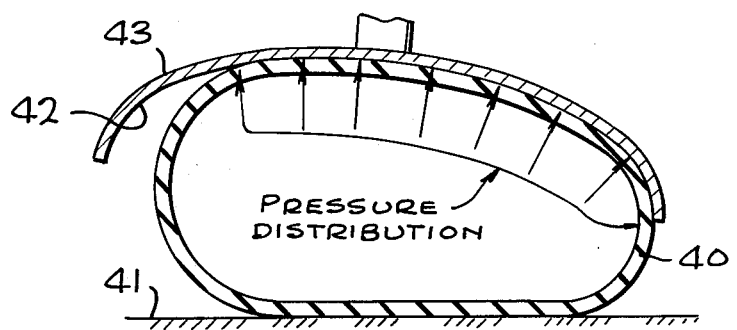
FIG. 7 is a view similar to that shown in FIG. 6 illustrating the system under applied load.

Referring now to FIG. 6, the inventive system is shown to include a tube 40 of elastic composition which is filled with a gas or liquid fluid. The tube is compressed between a supporting surface indicated by numeral 41 and the curved surface 42 of a pan 43. The contour of surface 42 is sufficient to cause the surface to seek or re-locate the center. The larger the radius of curvature, the lower the horizontal stiffness. In FIG. 7, the pan will move to the right of the drawing under compressive loading because of asymmetrical application of pressure to the tube. The arrows show pressure distribution under load. The resultant action provides self-centering back to the symetrical loading shown in FIG. 6.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A vibration suppressing, self-centering support mount for supporting a load on a base comprising at least three suspension assemblies interconnecting said load with said base wherein each of said suspension assemblies has a line of action which is oriented to intersect the center of gravity of the load for providing a three-dimensional, three-point suspension of said load over said base regardless of the attitude of said load, and wherein each of said suspension assemblies includes
    (a) a bottom bracket engaged to said base and having an upper face tilted at a substantially 30° angle relative to said base for applying a load centering force on said load,
    (b) a top bracket mounted on said load and having a lower face opposed to and parallel with said upper face of said bottom bracket,
    (c) a pneumatic element disposed between said opposing, parallel upper and lower faces of said brackets for both suppressing the transmission of vibrations between said load and said base and transmitting said load-centering force from said bottom bracket to said top bracket, said pneumatic element being formed from a thin walled, annular tube composed of an elastic material and filled with a gas to a pressure of substantially four pounds per square inch above the ambient atmospheric pressure,
    (d) a pan-shaped element mounted on a selected one of said opposing, parallel faces of said brackets for flexibly securing said pneumatic element between said parallel, opposing upper and lower faces of said bottom and top brackets, said pan-shaped element including a circular sidewall of a height less than the height of said thin-walled, annular tube forming said pneumatic element for receiving said element, whereby said pneumatic element of each suspension assembly cooperates with said tilted, parallel, opposing faces of said bottom and top brackets and said pan-shaped element of each assembly to provide a vibration suppressing, self-centering support mount.

2. The mount defined in claim 1 further including an azimuthal axis, wherein said suspension assemblies are arranged 120° from each other.

3. The mount defined in claim 1 wherein said annular tube forming said pneumatic element includes a gas valve means for adjusting the pressure of the gas admitted into said tube.

4. A vibration suppressing, self-centering support mount for supporting a load on a base comprising at least three suspension assemblies interconnecting said load with said base wherein each of the suspension assemblies has a line of action which is oriented to intersect the center of gravity of the load for providing a three-dimensional, three-point suspension of said load over said base regardless of the attitude of said load, and wherein each of said suspension assemblies includes
    (a) a bottom bracket engaged to said base and having an upper face tilted at a substantially 30° angle relative to said base for applying a load centering force on said load,
    (b) a top bracket mounted on said load and having both a lower face and an upper face parallel with said upper face of said bottom bracket wherein said lower face opposes said upper face of said bottom bracket,
    (c) a first pneumatic element mounted between said opposing, parallel upper and lower faces of said bottom and top brackets for both suppressing the transmission of vibrations between said load and said base and transmitting said load-centering force from said bottom to said top bracket, said first element being formed from a thin-walled, annular tube composed of an elastic material and filled with a gas to a pressure of substantially four pounds per square inch above the ambient atmospheric pressure,
    (d) a second pneumatic element mounted over said upper face of said top bracket and opposed to said first pneumatic element for suppressing the transmission of vibrations between said load and said base, said second element also being formed from a thin-walled, annular tube composed of an elastic material and filled with a gas to a pressure of substantially four pounds per square inch above the ambient atmospheric pressure,
    (e) first and second pan-shaped elements for flexibly securing said first and second pneumatic elements respectively, each of which includes a circular sidewall of a height less than the height of the respective pneumatic element it receives for securing its respective pneumatic element,
        (i) said first pan-shaped element being mounted on said upper face of said bottom bracket and flexibly securing said first pneumatic element,
        (ii) said second pan-shaped element being mounted over said upper face of said top bracket and flexibly securing said second pneumatic element, whereby said pneumatic element of each suspension assembly cooperates with said tilted, parallel, opposing faces of said bottom and top brackets and said first and second pan-shaped elements of each of said assemblies to provide a vibration suppressing, self-centering support mount.

5. The mount defined in claim 4 further including an azimuthal axis, wherein said suspension assemblies are arranged 120° from each other.

6. The mount defined in claim 1 wherein said annular tube forming said first pneumatic element and said annular tube forming said second pneumatic element includes a gas valve means for adjusting the pressure of the gas admitted into said tube.

7. A vibration suppressing, self-centering support mount for supporting a load on a base comprising at least three suspension assemblies interconnecting said load with said base wherein each of the suspension assemblies has a line of action which is oriented to intersect the center of gravity of the load for providing a three-dimensional, three-point suspension of said load over said base regardless of the attitude of said load, and wherein each of said suspension assemblies includes (a) a bottom bracket engaged to said base and having an upper face tilted at an angle relative to said base for applying a load centering force to said load, (b) a top bracket mounted on said load and having a lower face opposed to and substantially parallel with said upper face of said bottom bracket, (c) a pneumatic element disposed between said opposing, substantially parallel upper and lower faces of said brackets for both suppressing the transmission of vibrations between said load and said base while transmitting said load centering force from said bottom to said top bracket, said element being formed from a thin-walled air bag composed of an elastic material and filled with a gas to a pressure between two and six pounds per square inch above the ambient atmospheric pressure, (d) a pan-shaped element mounted on a selected one of said opposing, parallel faces of said brackets for flexibly securing said pneumatic element between said parallel, opposing upper and lower faces of said bottom and top brackets, whereby said pneumatic element of each suspension assembly cooperates with said tilted and opposing faces of said bottom and top brackets and said pan-shaped element of each of said assemblies to provide a vibration suppressing, self-centering support mount.

8. The mount defined in claim 7 further including an azimuthal axis, wherein said suspension assemblies are positioned on said base 120° apart from each other.

9. The mount defined in claim 7 wherein said pneumatic element further includes a gas valve for adjusting the pressure of the gas contained within said gas bag.

10. The mount defined in claim 7 wherein said bottom bracket is tilted at a substantially 30° angle from said base.

11. The mount defined in claim 7 wherein said pan-shaped element further includes an annular sidewall of a height greater than the height of said pneumatic element for securing said pneumatic element within said pan-shaped element.

12. A vibration suppressing, self-centering support mount for supporting a load on a base comprising at least three suspension assemblies interconnecting said load with said base wherein each of the suspension assemblies has a line of action which is oriented to intersect the center of gravity of the load for providing a three-dimensional, three-point suspension of said load over said base regardless of the attitude of said load, and wherein each of said suspension assemblies includes (a) a bottom bracket engaged to said base and having an upper face tilted at an angle relative to said base for applying a load centering force to said load, (b) a top bracket mounted on said load and having both a lower face and an upper face substantially parallel with said upper face of said bottom bracket, said lower face opposing said upper face of said bottom bracket, (c) a first pneumatic element disposed between said opposing, substantially parallel upper and lower faces of said bottom and top brackets for both suppressing the transmission of vibrations between said load and said base while transmitting said load centering force from said bottom to said top bracket, said element being formed from a thin-walled air bag composed of an elastic material and filled with a gas to a pressure between two and six pounds per square inch above the ambient atmospheric pressure, (d) a second pneumatic element mounted over said upper face of said top bracket for suppressing the transmission of vibrations between said load and said base, said pneumatic element also being formed from a thin-walled air bag composed of an elastic material and filled with a gas to a pressure between two and six pounds per square inch above the ambient atmospheric pressure, (e) a first pan-shaped element mounted on said upper face of said bottom bracket for flexibly securing said first pneumatic element between said opposing faces of said top and bottom brackets, (f) a second pan-shaped element mounted over said upper portion of said pneumatic element for flexibly securing said second pneumatic element over said upper face of said top bracket, whereby said pneumatic elements of each suspension assembly cooperates with said tilted and opposing faces of said bottom and top brackets and said first and second pan-shaped elements of each of said assemblies to provide a vibration suppressing, self-centering support mount.

13. The mount defined in claim 12 further including an azimuthal axis, wherein said suspension assemblies are positioned 120° apart from each other.

14. The mount defined in claim 12 wherein each of said first and second pneumatic elements further includes a gas valve for adjusting the pressure of the gas contained within their respective gas bags.

15. The mount defined in claim 12 wherein said bottom bracket is tilted at a substantially 30° angle from said base.

16. The mount defined in claim 15 wherein said first pan-shaped element has an annular sidewall of a height greater than the height of said airbag of said first pneumatic element, and said second pan-shaped element likewise has an annular sidewall of a height greater than the height of said airbag of said second pneumatic element.

17. The mount defined in claim 16 further including an azimuthal axis, wherein each of said three suspension assemblies are positioned on said base 120° apart from each other.

* * * * *